United States Patent
Sacks (10) Patent No.: US 7,431,524 B2
(45) Date of Patent: Oct. 7, 2008

(54) ADVANCED DATA CONTROLLED CLEANING SYSTEM

(75) Inventor: Roland Sacks, Bubikon (CH)

(73) Assignee: Avet-USA, Inc., Pompano Beach, FL (US)

( * ) Notice: Subject to any disclaimer, the term of this patent is extended or adjusted under 35 U.S.C. 154(b) by 201 days.

(21) Appl. No.: 11/359,717

(22) Filed: Feb. 22, 2006

(65) Prior Publication Data

US 2006/0140703 A1 Jun. 29, 2006

Related U.S. Application Data

(63) Continuation-in-part of application No. 10/906,532, filed on Feb. 23, 2005, now Pat. No. 7,056,050.

(60) Provisional application No. 60/521,137, filed on Feb. 24, 2004.

(30) Foreign Application Priority Data

Mar. 14, 2005 (DE) ...................... 20 2005 004 060

(51) Int. Cl.
*A47L 13/26* (2006.01)
*A47L 13/30* (2006.01)
(52) U.S. Cl. ..................... 401/139; 401/138; 401/195
(58) Field of Classification Search ......... 401/137–139, 401/195, 261, 265, 266, 268, 270, 284, 292
See application file for complete search history.

(56) References Cited

U.S. PATENT DOCUMENTS

| | | | | | |
|---|---|---|---|---|---|
| 6,048,123 | A | * | 4/2000 | Holt et al. | 401/139 |
| 6,663,306 | B2 | * | 12/2003 | Policicchio et al. | 401/138 |
| 6,669,391 | B2 | * | 12/2003 | Policicchio et al. | 401/139 |
| 6,964,535 | B2 | * | 11/2005 | Bell et al. | 401/138 |
| 7,056,050 | B2 | * | 6/2006 | Sacks | 401/139 |

* cited by examiner

*Primary Examiner*—Tuan Nguyen
(74) *Attorney, Agent, or Firm*—Robert M. Schwartz (57) ABSTRACT

An intelligent cleaning mop is disclosed, which includes a support shaft, a flat mophead connected to the support shaft, a cleaning pad detachably secured to the mophead, a reservoir, a sprayer for spraying cleaning fluid from the reservoir, a power supply device, a sensor for counting the number of times that the mophead oscillates, and a controller which enables deactivation of the sprayer when a predetermined criterion is meet. The intelligent cleaning mop further includes a port for downloading data and a key adaptor for local activation of the mop. The cleaning pad includes one or more microchips for providing ID and recording usage cycles. Further disclosed is an advanced data controlled cleaning system including a plurality of the intelligent mops and information-technology (IT) system. The IT system includes monitoring stations and/or central station, which communicates with the controllers and monitors usage of the intelligent mops and cleaning activities.

20 Claims, 9 Drawing Sheets

ADVANCED DATA CONTROLLED CLEANING SYSTEM

CROSS REFERENCE TO RELATED APPLICATION

This application is a Continuation-in-part of patent application Ser. No. 10/906,532, filed on Feb. 23, 2005 now U.S. Pat. 7,056,050, which claims the benefit under 35 USC 119 (e) of the provisional patent application Ser. No. 60/521,137, filed Feb. 24, 2004. Both parent applications are incorporated by reference herein in their entirety. This application further claims foreign priority benefits under 35 USC §119(a)-(d) or §365(b) of German Patent Application No. 20 2005 004 060.6, filed on Mar. 14, 2006.

FIELD OF INVENTION

The present invention relates to cleaning tools and an advanced data controlled cleaning system. In particular, it relates to an intelligent cleaning mop and a cleaning system using information-technology (IT) system to monitor the usage of a plurality of the intelligent mops and cleaning activities.

BACKGROUND OF INVENTION

A variety of basic cleaning tools are used to clean surfaces such as floors. These cleaning tools include conventional mopheads and the more recently developed flat mopheads ("flat mops"). These prior art devices rely on the thoroughness of the user to ensure that the cleaning was properly done. In particular, the user determines how much work is done for a given room, and when the cleaning device itself needs servicing (i.e., when the mophead should be washed, or when the disposable flat mop that should be replaced. It would be desirable to have a cleaning system which automatically monitors a user's activity to insure that the proper amount of work is performed, and to ensure that the mophead is cleaned or replaced at the appropriate time.

SUMMARY OF INVENTION

In one embodiment, the present invention is directed to an intelligent mop. The intelligent mop comprises a support shaft having upper and distal ends; a flat mophead having a upper surface connected to the distal end of the support shaft, and a substantially flat bottom surface; a cleaning pad detachably secured to the bottom surface of the mophead; a reservoir attached to the support shaft, for storing cleaning fluid; a sprayer in fluid communication with the reservoir, for spraying the cleaning fluid from the reservoir; a sensor for counting the number of times that the mophead oscillates; and a controller in communication with the sensor, the controller enabling deactivation of the sprayer when a predetermined criterion is meet.

The intelligent mop further comprises a power supply device electronically connected to the sensor, controller, and sprayer, a key adaptor for activation of the intelligent mop by a key, and a communication port for uploading software to and/or downloading data from the controller.

The sensor can be a motion sensor, disposed on the mophead or at distal end of the support shaft. The controller can be a PC board with embedded software, which communicates with the sensor, sprayer, communication port, key adaptor. The controller can further communicate remotely with an information-technology (IT) system.

The cleaning pad comprises one or more microchips which are in communication with the controller. The microchip provides a ID for the cleaning pad during its use with the intelligent mop and in a laundry facility, and it records usage cycle of the cleaning pad.

In a further embodiment, the present invention is directed to an advanced data controlled cleaning system, which comprises a plurality of intelligent mops of the present invention and an information-technology (IT) system in remote communication with the controller of the intelligent mops. The IT system comprises one or more monitoring stations, and it monitors the usage of intelligent mops, and cleaning activities.

The invention will be better understood from the ensuing description of preferred embodiments.

DETAILED DESCRIPTION

The present invention provides an Advanced Data Controlled Cleaning System (ADCCS). The ADCCS provides a novel system for cleaning surfaces. The system uses advanced IT functions to monitor and control cleaning efficiency. By ensuring that cleaning efficiency is improved, the system makes it possible to prevent transmission of bacteria, viruses or other contaminants. In facilities such as hospitals, a substantial number of patients and staff are exposed to a variety of infectious agents. By improving cleaning efficiency, and ensuring that each room is properly cleaned, the ADCCS makes a substantial and measurable contribution to the fight against hospital generated illnesses. In addition to providing a safer environment for individuals in the hospital environment, the ADCCS also reduces liability risks by reducing the possibility of infection due to the transmission of bacteria, viruses or other contaminants to individuals in the hospital.

The ADCCS has several components. A primary component is an intelligent flat mop. The intelligent mop has two primary functions: First, it provides a unique ID which allows each flat mop in a facility to be identified by an IT system.

Second, it incorporates motion sensing technology which allows the flat mop to monitor cleaning cycles by counting the amount of times that the flat mop is swiped across the floor. The motion information can be used by the ADCCS to determine when the mophead requires extra cleaning fluid, when the mophead itself should be cleaned, or when the mophead should be replaced. Of course, it also allows the system to monitor when the cleaning work was done and where it was done to ensure that the facility was properly cleaned.

In the preferred embodiment, the motion sensing is accomplished by an oscillation gauge. Oscillation gauges are well-known in the art and do not have to be further described herein. The oscillation gauge ensures that the room has been thoroughly cleaned. For example, by means of the oscillation gauge, a Target/Actual comparison can be made. The number of swipes required to clean a given room can be defined as the Target. Deviations within a certain tolerance will be permissible. Too many oscillations (i.e. swipes across the floor) means that somebody worked too much. While this does not impair cleanliness, it wastes the user's time which results in excessive labor costs. On the other hand, too few oscillations means that the room has not been cleaned thoroughly. This leads to an increased danger to patients and workers due to transmission of bacteria, viruses or other contaminants. In this situation, there is an increased liability exposure for the company. This is a serious problem in environments such as a hospital, where many people die each year as a result of infections acquired in the hospital.

In the preferred embodiment, the intelligent mop has an implant chip or PC board, which communicates with the oscillation gauge, and is also used to control distribution of cleaning fluids. The cleaning fluids are sprayed from the reservoir onto the cleaning surface during the normal course of use. After a predetermined number of oscillations the spraying will be interrupted, because the flat mop requires the mophead to be cleaned or replaced. Once the cleaning or replacement is accomplished, the spray mechanism is re-enabled. Those skilled in the art will recognize that the ADCCS can be structured such that the cleaning pad replacement from the mophead can be controlled from the IT system, or controlled locally at the flat mop. Optionally, the number of oscillations can be adjusted on the flat mop, or remotely from the IT system.

In addition to monitoring cleaning performance, the IT system can also be used to control replacement of individual mopheads on a scheduled basis. For example, each mophead can have its own unique identification code, in the form of an RFID tag or other suitable device, which can be used to monitor how long a particular mophead has been used. The system can then notify the user to replace the mophead. To insure quality, the unique identification code can be used to allow only mopheads having a particular level of quality to work with the system.

In contrast to a conventional mop, the intelligent flat mop provided by this invention requires a power supply to power its integral circuits. In the preferred embodiment, the power supply is a battery, which is preferably rechargeable. The recharger mechanism can be integrated into the flat mop, or be an external unit which recharges removable batteries. Those skilled in the art will recognize that the mop can also be powered by an external cord attached to a wall outlet.

The preferred embodiment of the flat mop also takes into account ergonomic factors. For example, a telescopic handle is used on the preferred embodiment to accommodate varying heights of users. In the preferred embodiment, the flat mop has an adjustable length of 120 cm-160 cm (47"-63"). However, those skilled in the art will recognize that the length of the flat mop is not critical and can vary. The flat mop in the preferred embodiment also has a swivel at the distal end of the flat mop to accommodate movement of the flat mop when cleaning various parts of a room. This also assists the user when the user is attempting to achieve the maximum oscillation during use. The handle of the flat mop is at the flat mop's proximal end. The handle is intended to be designed such that it is possible for the user to comfortably work for long periods without getting tired.

Spray initiation is also controlled from the flat mop. Spray initiation can be controlled by a manual pump, an air (or gas) pressurized pump, or an electrical pump. The spray initiation preferably requires a small amount of pressure or tension by the user's hands or fingers to start. In the preferred embodiment, the flat mop also includes a locking device that locks the sprayer in the open position to allow larger amounts to be sprayed. Likewise, the preferred embodiment also provides for adjustable dosage. By being able to adjust the dosage, the amount of chemicals used can be more precisely controlled to suit a particular circumstance.

Third, the ADCCS also includes a timing system that allows the ADCCS to monitor the time that the mophead enters and exits a particular room, and the amount of time the mophead was used in a particular room.

The preferred embodiment of the flat mop includes an integral reservoir for holding cleaning solution. The flat mop is further designed such that the reservoir will only release cleaning solution if a cleaning pad is attached and has not exceeded its allowed cleaning cycle usage levels. In the preferred embodiment, after the cleaning pad has been washed 350 times, the release of the cleaning solution will be stopped, the old cleaning pad must be discarded, and a new cleaning pad must be installed on the flat mop. By so doing, the system ensures that the flat mop is using a cleaning pad that is capable of proper levels of absorption. Those skilled in the art will recognize that while the preferred embodiment uses a 350 oscillations cycle for the cleaning pad, this number is not critical and can vary base on the needs of a particular environment.

In the preferred embodiment, the cleaning solution used by the ADCCS includes antibacterial agents. These antibacterial agents reduce the possibility of patient or employee infections which can result from increased bacteria in rooms which are not properly cleaned.

Another important component of the ADCCS is the information technology ("IT") system. The IT system allows multiple flat mops in a large facility to be simultaneously monitored from a single location. By monitoring usage of individual flat mops, the IT system can determine when flat mops require servicing, and whether or not every room in the facility has been properly cleaned. In addition, the IT system can monitor the performance of cleaning personnel by associating particular flat mops with particular individuals. This allows the ADCCS to measure individual performance on an ongoing basis. In the preferred embodiment, the worker has to identify him/herself by Login and Logout on the tool. This can be accomplished by a variety of means. For example, the worker can use an ID card to activate the flat mop when the worker enters the room. This can be done via an RFID tag, a barcode, by entering a code into a keypad, or any other suitable means of identification. Likewise, the identification device can also be embedded in the flat mop such that it automatically activates when it enters the room. This allows the ADCCS to monitor which individual is working with the tool, where that individual is working with the tool, and when that individual is working with the tool.

Those skilled in the art will recognize that the IT system can be controlled in a variety of ways, such as through hard wiring, software, etc. In the preferred embodiment, the IT system is preferably controlled by software, and the individual mops are preferably in communication with the IT system via wireless transmission. The software is preferably capable of performing multiple functions. For example, it should be able to execute some or all of the following functions:

a) Run evaluations of the usage of each of the tools.

b) Enter evaluations about the used mops.

c) Collect data on the usage by person, or by flat mop, for each room/area to be cleaned.

d) Run target/actual comparisons.

e) Calculate cleaning efficiency.

f) Provide evidence for actual cleaning efficiency (quality control).

g) Maintain records regarding flat mop usage and automatically control inventory and the reordering process.

h) Communicate via a link to the internet, where multiple locations in a large company can upload or download additional data to the company headquarters where additional data evaluations may be made to reflect usage throughout the company.

To this point, we have discussed the ADCCS in terms of its use in a hospital environment. However those skilled in the art will recognize that this system provides substantial benefits to any environment which requires a high level of controllable cleanliness.

Having discussed the features and advantages of the invention in general, we turn now to a more detailed discussion of the intelligent mop and the ADCCS system illustrated by the figures.

Figure 1:
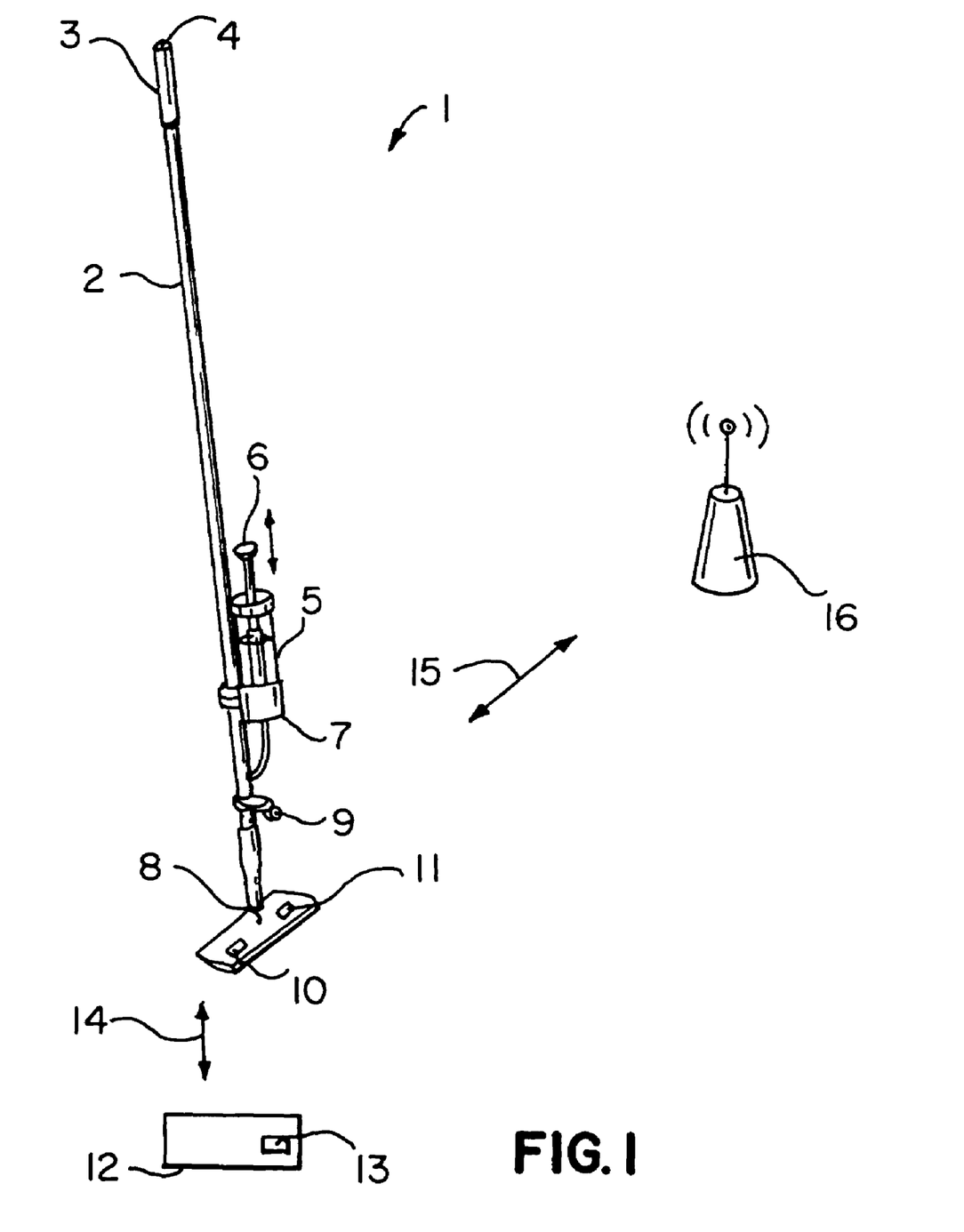
FIG. 1 illustrates a perspective view of one embodiment of the intelligent mop used by the ADCCS system.

FIG. 1 illustrates a perspective view of one embodiment of the intelligent cleaning mop 1 used by the ADCCS system. As shown in this figure, the central support structure of the intelligent cleaning mop 1 is a support shaft 2. At the upper end of the support shaft 2 is handle 3 which is grasped by the cleaning person during use. Also shown is button 4 which is located in the handle 3. Button 4 is used to control release of cleaning fluids from reservoir 5. This can be accomplished by any suitable means. For example, button 4 can be attached to a mechanical linkage which controls valve (not shown) between reservoir 5 and sprayer 9 at the proximal end of the intelligent cleaning mop 1. Alternatively, it can be controlled electronically by a solenoid (not shown) which is activated by button 4. Numerous methods of controlling valves are well known in the art. As a result, any suitable method can be used.

When the valve is activated by button 4, cleaning solution is delivered under pressure from reservoir 5 to sprayer 9. The spray is ejected onto the surface in front of the mophead 8. As a result, the cleaning person can control when and where cleaning solution is sprayed.

The reservoir 5 which holds cleaning solution can be pressurized in several ways. It can use an optional manual pump 6, which is illustrated in this figure. Alternatively, pressure can be provided by a powered pump (not shown). Pumps are well-known in the art. A powered pump would preferably be powered by batteries 7 stored underneath reservoir 5.

At the distal end of support shaft 2 of the intelligent cleaning mop 1 is the mophead 8. In the preferred embodiment, mophead 8 is an intelligent device. It contains a motion sensor 11 which detects and counts the number of swipes made by the mophead 8. This information is input to a controller 10.

Controller 10 communicates via wireless link 15 to a monitoring station 16 which in turn communicates with a central computer facility 18 (shown below in FIG. 2). As a result of this communication link, the central computer facility 18 can monitor multiple intelligent cleaning mops 1 in locations spread throughout a facility. It can tell if individual rooms have been cleaned on a timely basis, it can tell if an individual worker is wasting time by cleaning too much, or it can tell if a worker is not spending enough time cleaning a room. The information gathered by the ADCCS can be used to evaluate worker performance, and more important, it can be used to ensure that a facility is properly cleaned on a timely basis.

Also shown in this figure is cleaning pad 12. For ease of illustration, cleaning pad 12 is shown detached from mophead 8. Cleaning pad 12 is detachably secured to mophead 8 during use. It is intended to be attached for cleaning or to be replaced at appropriate times. Cleaning pad 12 can be fabricated from any suitable material which is compatible with the particular floor or surface being cleaned, and compatible with the particular cleaning fluids being used.

Also shown in this figure is wireless link 14 that allows microchip 13 to communicate with controller 10. While it is possible to use a hard wired connection, the preferred embodiment envisions a wireless link, embedded in the cleaning pad 12 which will be invisible to the user. The wireless link 14 can take any suitable form, and can communicate with any convenient technology, such as RF, magnetic or passive means. For ease of discussion, the term "microchip" is used. However, those skilled in the art will recognize that it can be implemented by simple devices such as RFID tags, or more intelligent microchips can be used to communicate information between the controller 10 and microchip 13.

In the preferred embodiment, each cleaning pad 12 will have a unique ID associated with it. This allows the controller to identify and recognize cleaning pad 12. This allows the ADCCS system to control what types of cleaning pads 12 are used with a particular mophead 8. This provides two major benefits: it ensures that only cleaning pads 12 which have a predetermined quality level are used, and it ensures that cleaning pads 12 are replaced on a timely basis. One method of ensuring that this happens is to program controller 10 such that it can turn off valve in the event that a defective or worn out cleaning pad 12 is used. In a preferred embodiment of the invention, the sprayer is disabled under these conditions until a new cleaning pad 12 is installed. This can be controlled from controller 10 inside the intelligent cleaning mop 1, or remotely controlled from computer 18.

Also shown in this figure is monitoring station 16, which is not part of intelligent cleaning mop 1. In the preferred embodiment, monitoring stations 16 are distributed throughout a facility, and act as a relay points for computer 18. By using low-power monitoring stations 16, the system can be implemented without causing interference with other communication or data systems.

Figure 2:
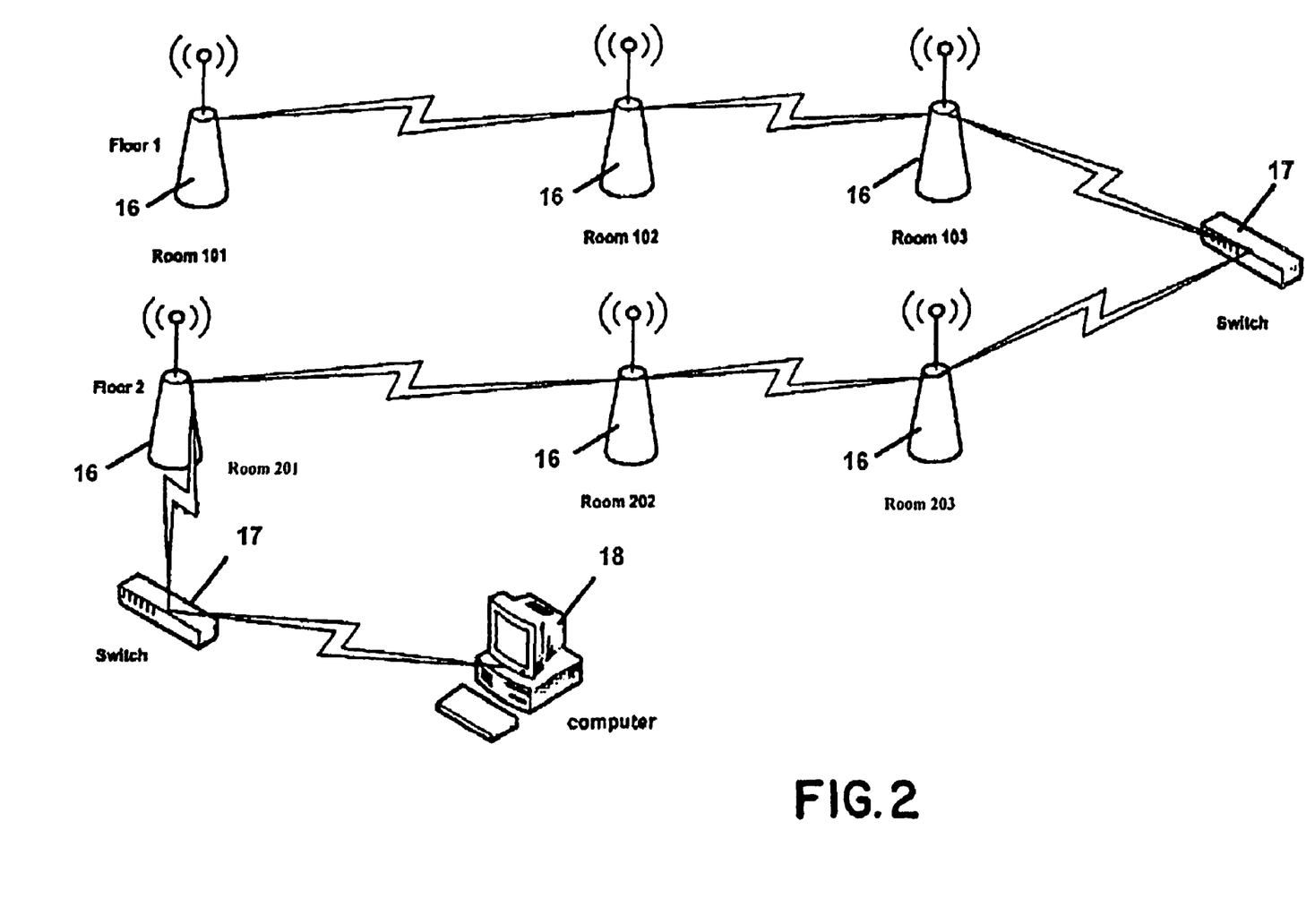
FIG. 2 is a diagram that illustrates a preferred embodiment of the communication and control links utilized by the ADCCS system.

FIG. 2 is a diagram that illustrates a preferred embodiment of the communication and control links utilized by the ADCCS system. In this figure, a plurality of monitoring stations 16 are shown in remote rooms and locations throughout a facility. Also shown in this figure are switches 17 which act as communication points for the various monitoring stations 16. In the preferred embodiments, the monitoring stations 16 can communicate directly with the switch 17, or can be daisy chained to facilitate low-power transmission over wide physical areas. This figure illustrates the data being accumulated by the switches 17 and then transmitted to computer 18. However those skilled in the art will recognize that as long as there is suitable signal strength, the monitoring stations 16 could also be used to communicate directly with the computer 18. In fact, in a small physical facility, the switches 17 may be eliminated entirely.

In some cases, where an organization's facilities are spread over wide geographic areas, each computer 18 at a given facility can communicate with a central computer in a remote location. This will allow a company to monitor work being performed across the country, or around the world. In this situation, the local computer 18 at each facility would communicate with the central computer or mainframe at company headquarters.

Figure 3:
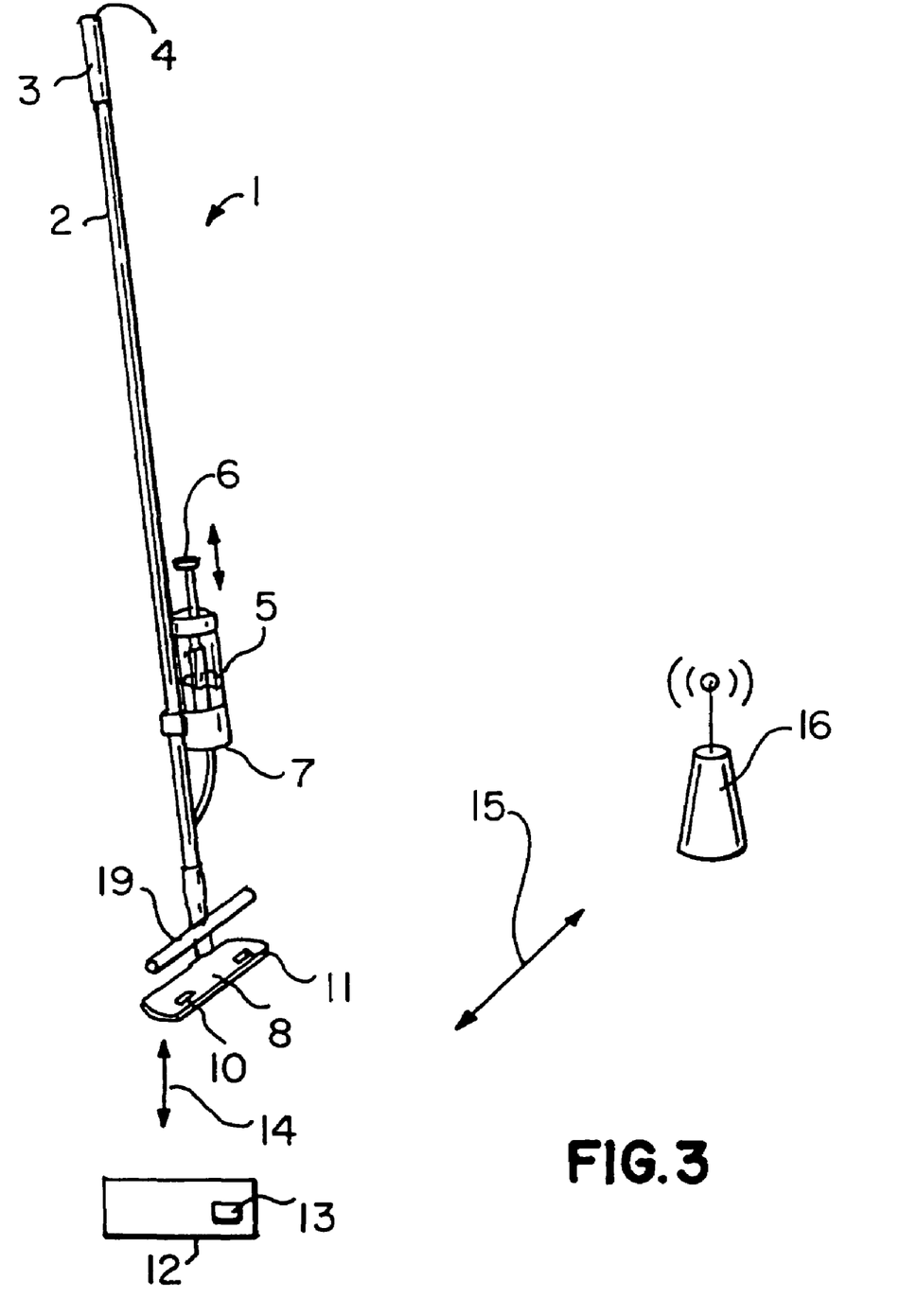
FIG. 3 is a perspective view of another embodiment of intelligent mop that uses a spray bar in place of the sprayer shown in FIG. 1.

FIG. 3 is a perspective view of an alternative preferred embodiment of intelligent cleaning mop that uses a spray bar 19 in place of sprayer 9 shown in FIG. 1. While sprayer 9 used by the previous embodiments produced a single spray string, spray bar 19 sprays multiple streams across a wider horizontal area. Depending on the nature of liquids being spread across a surface, simultaneous application of fluid to a wide surface area may be desirable.

Figure 4:
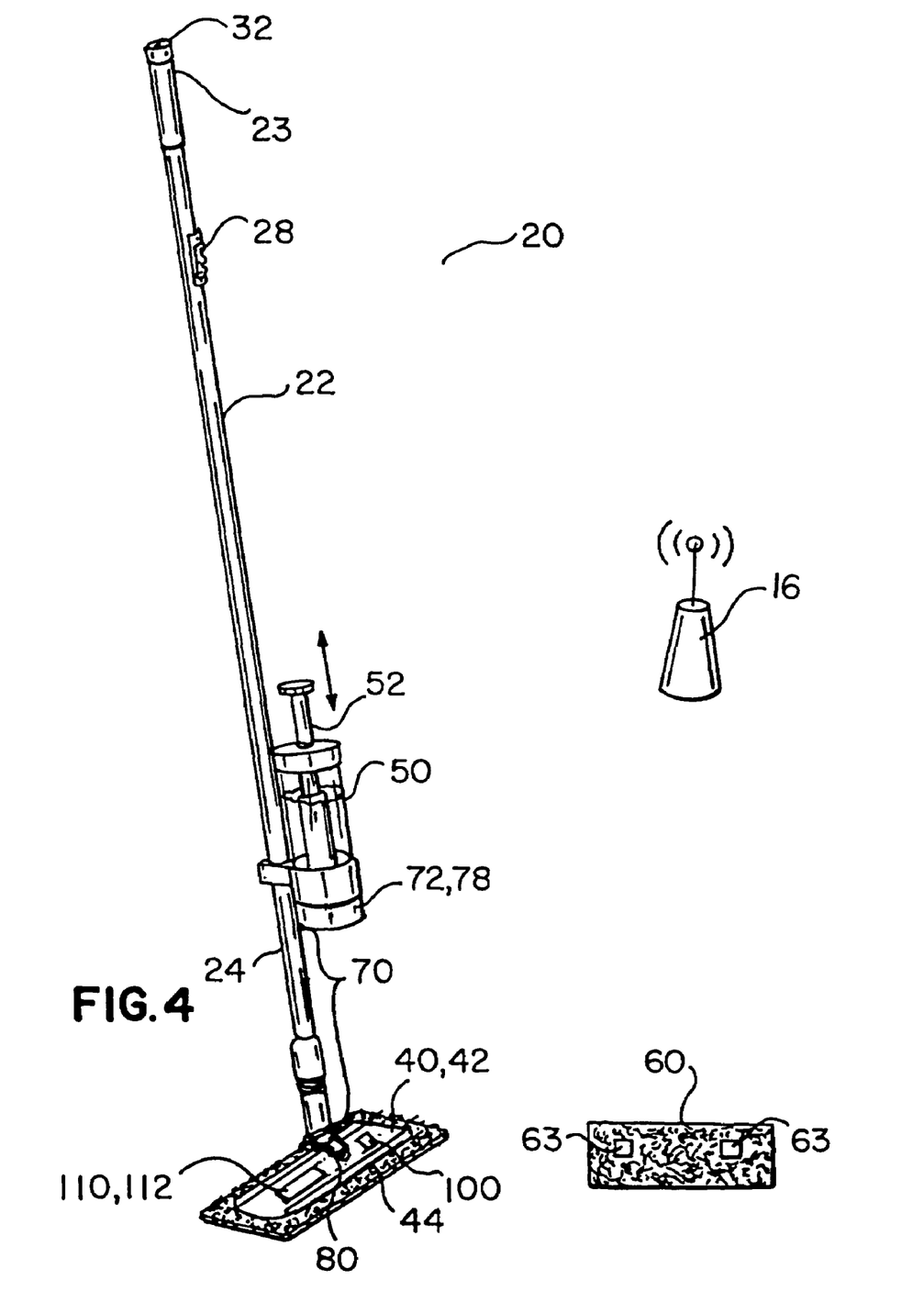
FIG. 4 is an illustrated view of a further embodiment of intelligent mop of the present invention.

FIG. 4 is an illustrative view of a further embodiment of the intelligent mop of the present invention. As shown, intelligent mop 20 comprises support shaft 22, flat mophead 40, reservoir 50, cleaning pad 60, sprayer 70, sensor 100, and controller 110.

Figures 4A, 4B:
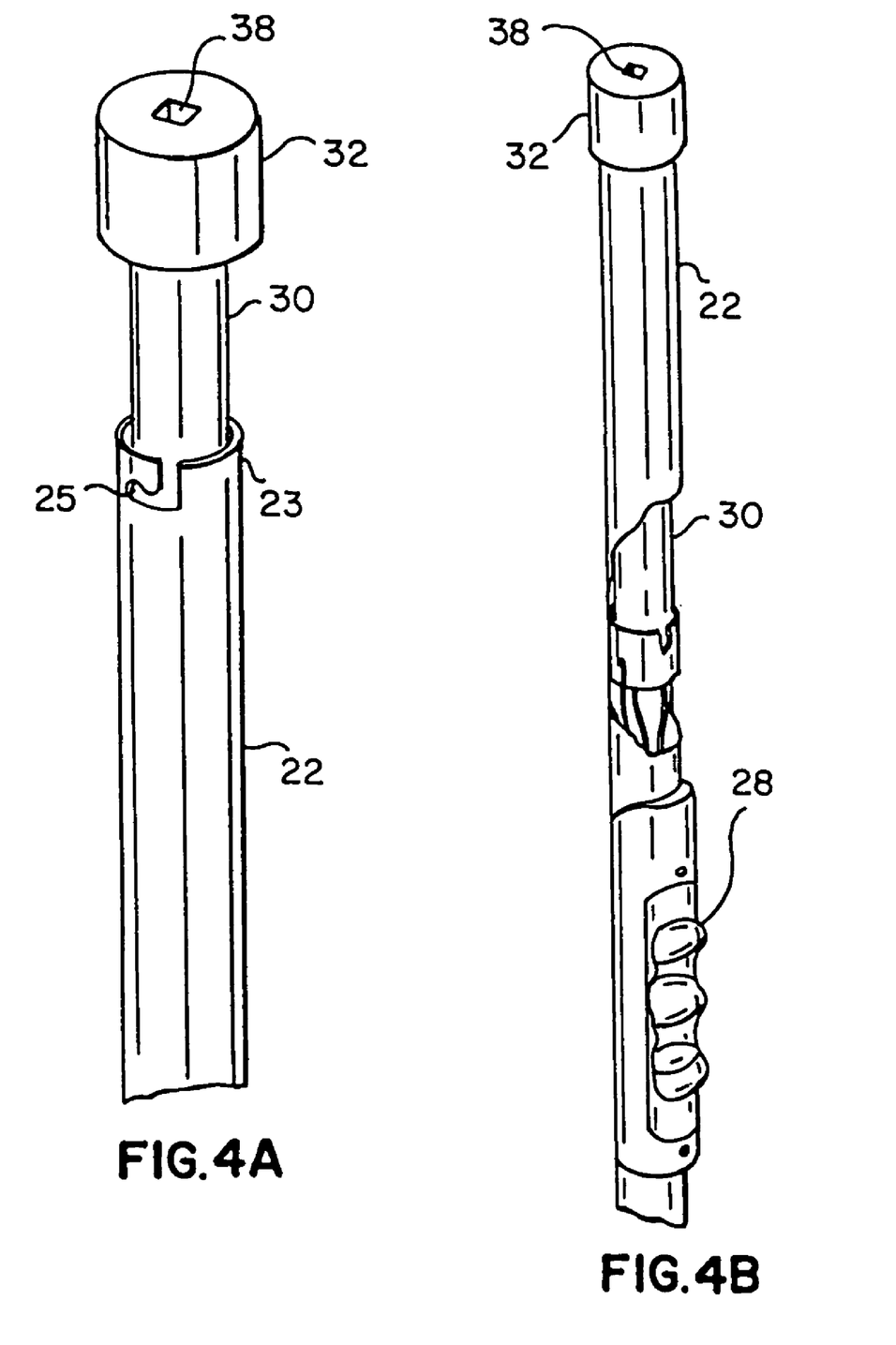
FIG. 4A is a partial exploded view of the upper end of the support shaft of the intelligent mop shown in FIG. 4, showing a USB port and the connection mechanism between the battery pack and the support shaft.
FIG. 4B is a partial exploded view of part of the support shaft of the intelligent mop shown in FIG. 4, showing the switch and the electrical connection with the battery pack.

Support shaft 22 has an upper 23 and a distal end 24. In the embodiment shown, support shaft 22 further includes a power supply device for supplying power to sensor 100, controller 110, and other components of intelligent mop 20 as described hereinafter. As shown in FIG. 4A, the power supply device can be a battery pack 30 disposed within the upper portion of support shaft 22 through open upper end 23. There are connection means between upper end 23 of support shaft 22 and cap 32 of battery pack 30 to lock battery pack 30 into support shaft 22. In the embodiment shown, a slit 25 at upper end 23 can be locked on to a pin (not shown) in cap 32. Battery pack 30 can be rechargeable or can include disposable batteries.

As shown, cap 32 has a port 38, which is electrically connected to battery pack 30 and to controller 110. In one embodiment, port 38 can be a USB port, which can function as a key adaptor for activation of intelligent mop 20 by an external key, and can also be a communication port for uploading software, or downloading data from controller 110. In the embodiment shown, the USP port functions as both key adaptor and the communication port for controller 110. However, it should be understood that the key adaptor and the communication port can also be two separate interface components.

As shown in FIG. 4B, the upper portion of support shaft 22 further includes a switch 28, which is connected by wires to battery pack 30 and to sprayer 70. As shown, switch 28 has grooves configured to receive user's fingers. Switch 28 can be activated when it is compressed by a user's hand. Reservoir 50 is attached to the lower portion of support shaft 22, for storing and supplying cleaning fluid. As described previously, reservoir 50 can have a manual pump 52.

Figure 5:
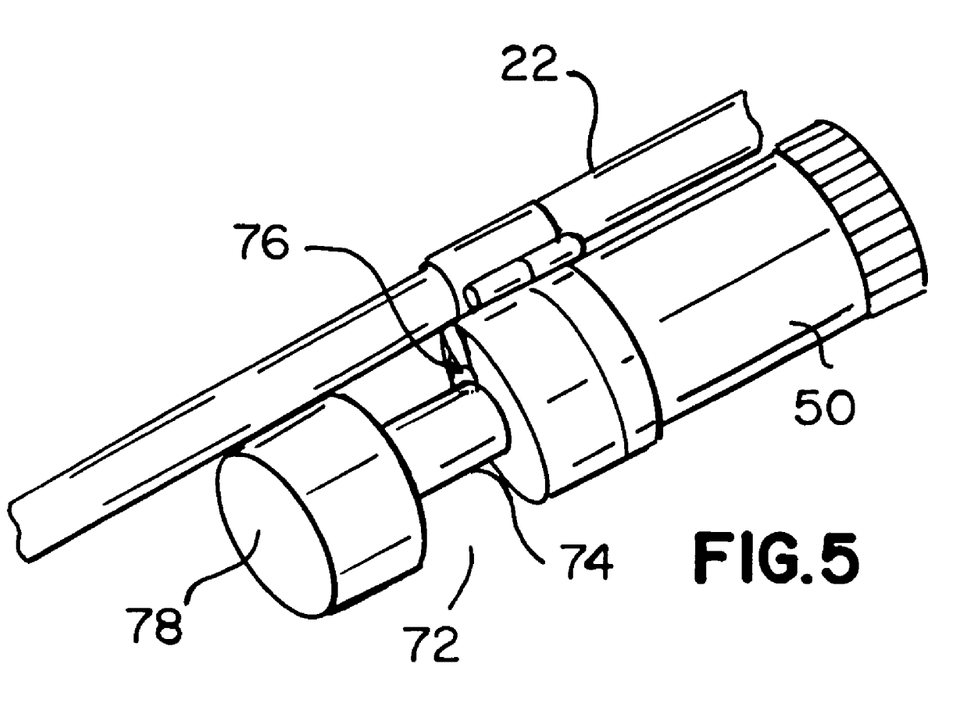
FIG. 5 is a perspective view of the electrical pump and valve assembly of the intelligent mop shown in FIG. 4.

In the embodiment shown, sprayer 70 comprises a floor spray head 80 connected to upper surface 42 of mophead 40, an electrical pump and valve assembly 72, attached to the bottom of reservoir 50, and a fluid feed tubing 79 (shown in FIG. 6) connecting assembly 72 to floor spray head 80. Part of fluid feed tubing 79 is disposed within support shaft 22. FIG. 5 shows electrical pump and valve assembly 72, which includes an electrical pump 74 and mechanical valve 76, with a pump cover 78 in an open position. In FIG. 4, pump cover 78 is in a closed position. Pump 74 is connected to battery pack 30 and switch 28 inside support shaft 22, and is activated by switch 28. When a user compresses switch 28, a predetermined amount of cleaning liquid is delivered from reservoir 50 and is sprayed out through floor spray head 80 in front of mophead 40.

Figure 6:
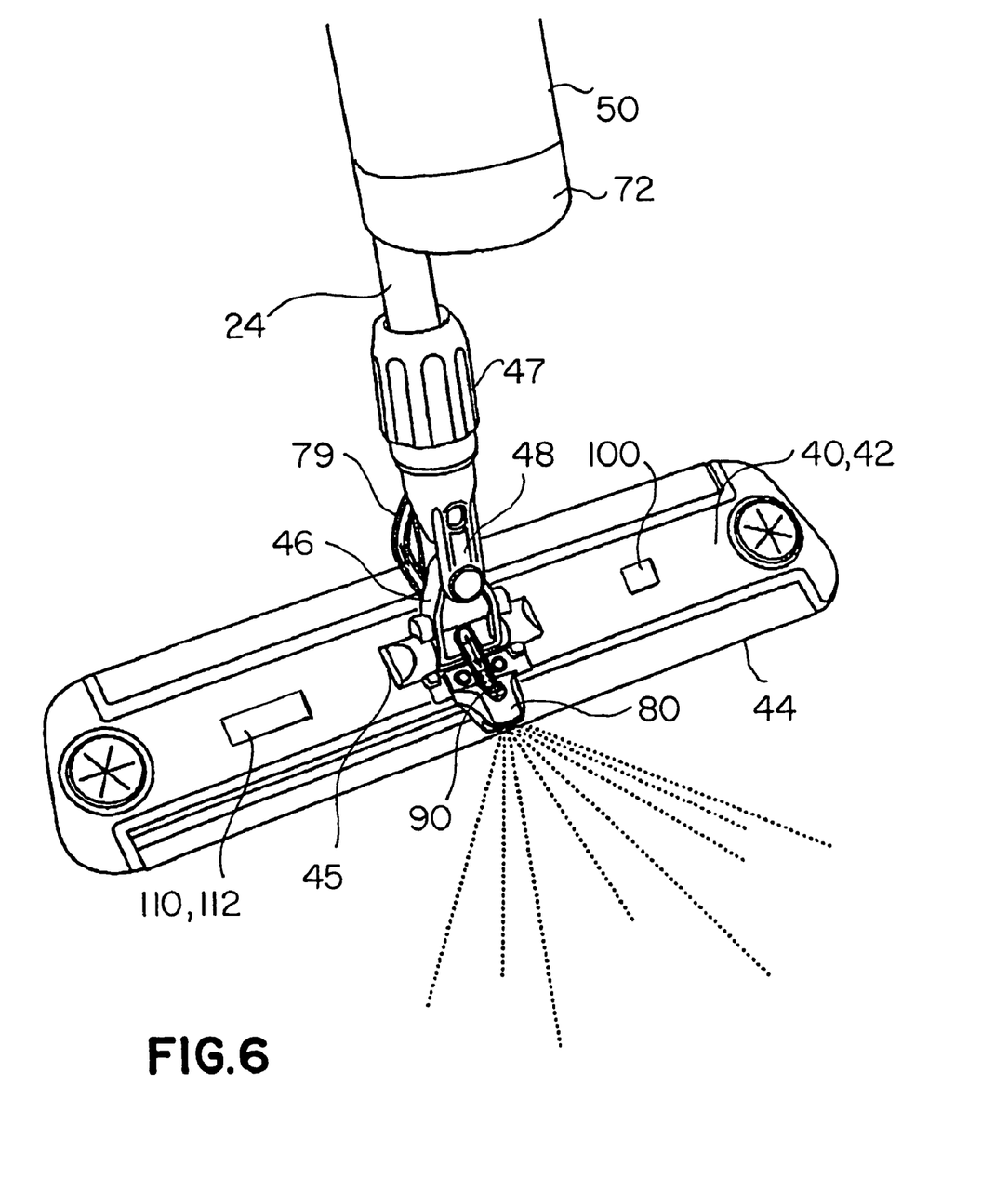
FIG. 6 is a perspective view of the mophead of the intelligent mop shown in FIG. 4.
Figures 7, 7C:
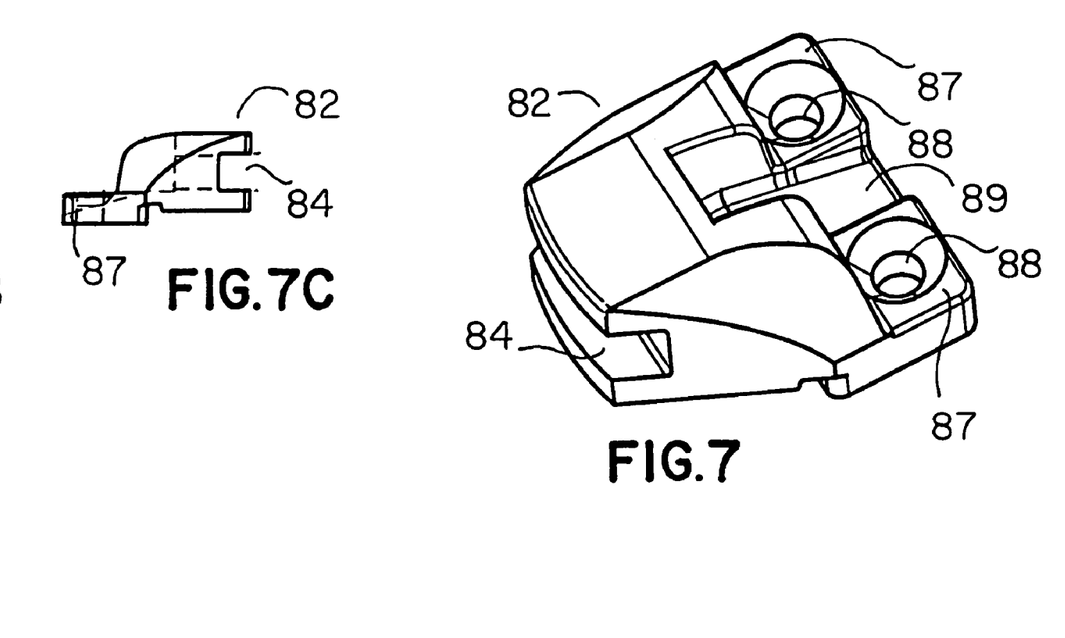
FIG. 7 is a perspective view of the floor spray head.
FIGS. 7A, 7B and 7C are top, front and side views of the floor spray head of FIG. 7, respectively.
Figures 7A, 7B:
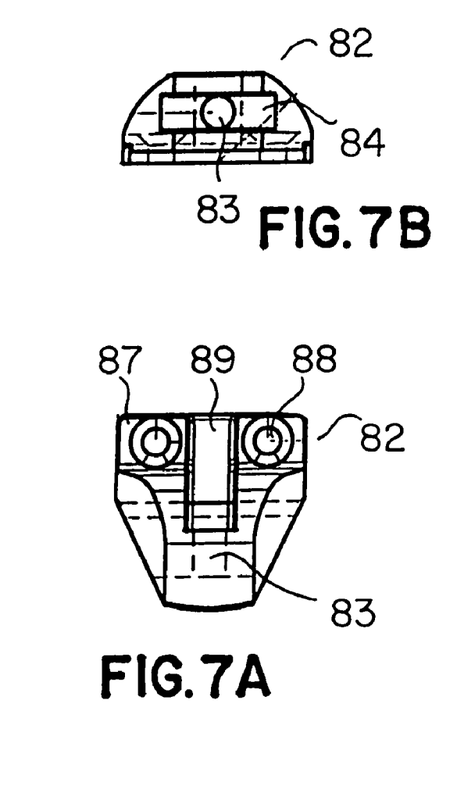

As an alternative of sprayer 9 and spray bar 19 of intelligent mop 1 shown in FIGS. 1 and 3, sprayer 70 of intelligent mop 20 has a floor spray head 80 that is substantially closer to the floor surface. With floor spray head 80, the cleaning fluid is sprayed in a flat zone right in front of mophead 40, which avoids potential wetting of walls and furniture during cleaning. Furthermore, the creation of aerosols will be reduced to a minimum and potential activity loss of the disinfection agents in air is also minimized. FIG. 6 shows a perspective view of floor spray head 80 attached to upper surface 42 of mophead 40. Floor spray head 80 comprises spray head body 82 and spray nozzle 90. FIG. 7 shows a perspective view of spray head body 82. FIGS. 7A, 7B and 7C are the top, front and side views of spray head body 82 of FIG. 7, respectively. As shown, spray head body 82 has a securing flange 87, a pair of fastening openings 88 for securing screws, and center mounting seat 89. At the front, spray head body 82 has a slot-shaped spray jet outlet 84, being open at the side edge, which has a rectangular, or U-shaped cross-section. At the center of slot-shaped spray jet outlet 84, there is a through nozzle hole 83 for holding spray nozzle 90.

Figure 8:
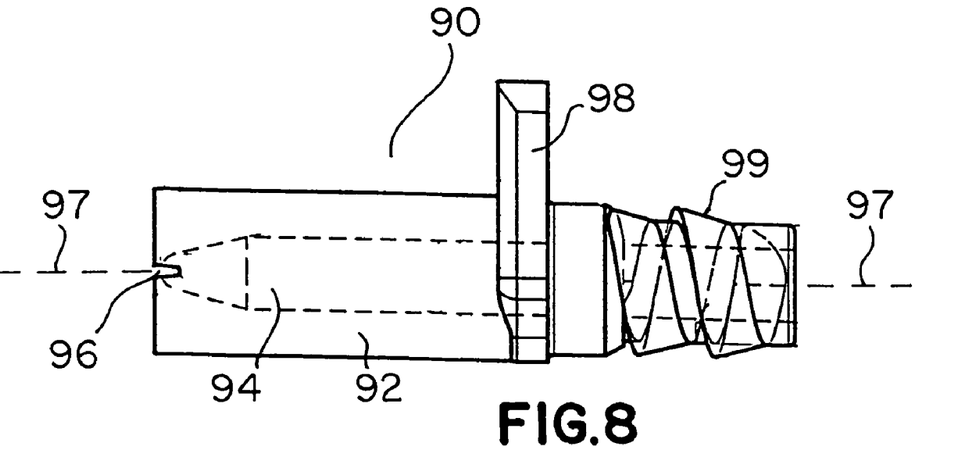
FIGS. 8 and 8A are side and front views of spray nozzle of the floor spray head, respectively.
Figure 8A:
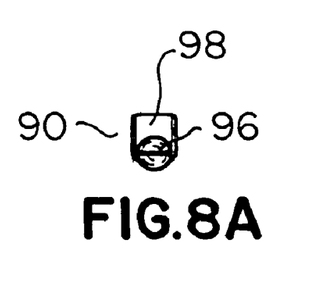

FIGS. 8 and 8A show the side and front views of spray nozzle 90, respectively. As shown, spray nozzle 90 has hollow body 92, through-channel 94, ejection slot 96, locking flange 98 and tubing connection section 99. Spray nozzle 90 is inserted into through nozzle hole 83 from mounting seat 89 with lock flange 98 facing up and ejection slot 96 in horizontal position in parallel to slot-shaped spray jet outlet 82. Fluid feed tubing 79 is connected to tubing connection section 99 of spray nozzle 90. Spray generated from ejection slot 96 is in a fan shape, being flat in height. With a further guidance by slot-shaped spray jet outlet 84, the cleaning fluid that is sprayed out is in a flat surface covering manner onto the floor in front of front edge 44 of mophead 40. In the embodiment shown, ejection slot 96 is aligned with longitudinal axis 97 of spray nozzle 90. However, an angle between ejection slot 96 and longitudinal axis 97 can be provided for adjusting the direction and width of the spray. For example, by providing a positive angle between ejection slot 96 and longitudinal axis 97 of spray nozzle 90, the spray is ejected with an upward angle, and the spray width generated on the floor is increased.

Depending on the width of mophead 80 to be used, the width of spray can be adjusted between about 20 cm and about 60 cm. In one exemplary embodiment, the spray width can be adjusted by adjusting the height of securing flange 87. By increasing or decreasing the height of securing flange 87, the spray width can be increased, or decreased. In an alternative embodiment, the spray width can be adjusted by changing the angle of ejection slot 96 to longitudinal axis 97 of spray nozzle 90, as described above.

Further shown by FIG. 6 is the connection mechanism between mophead 40 and support shaft 22, which includes a retainer 45, a vertical pivot joint 46 retained by retainer 45, a horizontal pivot joint 48 connected to the upper portion of vertical pivot joint 46, and a shaft mount 47 connected to the upper portion of horizontal pivot joint 48. Distal end 24 of support shaft 22 is secured into shaft mount 47.

As shown in FIG. 6, sensor 100 is attached to upper surface 42 of mophead 40. Alternatively, sensor 100 can be disposed on retainer 45. Furthermore, sensor 100 can also be attached to distal end 24 of support shaft 22. As described previously, sensor 100 is a motion sensor which counts the number of times that mophead 40 oscillates. Sensor 100 can be either an oscillation gauge or a radial transducer.

Controller 110 is attached to upper surface 42 of mophead 40. In one embodiment, controller 110 is a microprocessor, or PC board, 112 with appropriate software for performing its predetermined functions. PC board 112 is connected to battery pack 30 inside support shaft 22 for power supply. PC board 112 is in communication with sensor 100, either by wire or through wireless link; and it is further in communication with electrical pump 74 and switch 28. It receives data from sensor 100 to record the number of times that mophead 40 oscillates. Once the data collected meets a predetermined criterion, for example, a maximum number of swipes (equal to the number of oscillations) that a specific cleaning pad is allowed to have, PC board 112 disables electrical pump 74, or switch 28. Then, no spray of the cleaning fluid is provided for further cleaning. Moreover, through communication with switch 28, PC board 112 can record the number of times that the switch is activated, the information can be used for calculating the amount of cleaning fluid is used, and for monitoring whether adequate amount of cleaning fluid is used for a specific room or area, which, in turn, is used for monitoring whether the cleaning is performed according to the disinfection standards set up in a hospital.

Cleaning pad 60 is detachably secured to the bottom surface of mophead 40. Preferably, cleaning pad 60 is made of microfiber which can be washed for more than 300 times. In one embodiment, a layer of loop material is sewed on the upper side of cleaning pad 60; and there are two strips of hook material secured along the flat bottom surface of mophead 40. Cleaning pad 60 is detachably attached to the bottom surface of mophead 40 by a hook-loop connection. Cleaning pad 60 has one or two microchip 63 secured on the upper side of cleaning pad 60, facing the bottom surface of mophead 40 when cleaning pad 60 is attached to mophead 40. Microchip 63 can communicate with PC board 112 by direct electrical connection, or through a wireless link. In one embodiment, an aperture is made through upper and bottom surfaces of mophead 40 underneath the location of PC board 112. An electrical connection point is provided at the aperture to the bottom surface of mophead 40. Microchip 63 is so positioned on cleaning pad 60 that upon attaching to mophead 40, microchip 63 is in direct contact with the electrical connection point. In a further configuration, two microchips 63 are positioned symmetrically on the upper side of cleaning pad 60. With this configuration, if a user reverses the direction of cleaning pad 60 when attaching it to mophead 40, the second microchip 63 will be in contact with the connection point. Therefore, it requires minimum user training. Upon attaching cleaning pad 60 to mophead 40, PC board 112 verifies a right cleaning pad being used by recognizing the information provided by microchip 63, and activate intelligent mop 20 for working. If a cleaning pad does not have microchip 63 or the microchip does not have a proper ID, the intelligent mop will be not be activated.

Typically, microchip 63 remains active during the lifetime of cleaning pad 60, and it performs mainly two functions. First, microchip 63 provides an ID for a specific cleaning pad 60, which can be used for identifying the designated use of a specific type of cleaning pad. For example, a regular cleaning pad can be used for cleaning large floor areas, such as multiple rooms. On the other hand, a cleaning pad for cleaning a highly contaminated area, such as a hospital room which has a patient having a highly contagious disease, is only allowed to be used once, and must be replaced after cleaning that room. This ID information is communicated to PC board 112 by microchip 63, and is used by PC board 112 for controlling the activity of the mop. PC board 112 can either set the maximum allowable number of swipes for the specific type of cleaning pad, or upon receiving a room change indication, deactivate sprayer 70 until the cleaning pad is replaced. Second, microchip 63 records the number of times that cleaning pad 60 is washed, which is equivalent to recording usage cycles of a cleaning pad. Herein, each usage cycle includes using the cleaning pad on the mophead for cleaning, being detached and washed for use again. Microchip 63 is heat sensitive, therefore, when being washed with warm water microchip 63 records the washing, or completion of one usage cycle. Alternatively, microchip 63 can use its timer to record the time that cleaning pad 60 is dissociated from mophead 40, and use a predetermined timing criterion to judge that the cleaning pad is sent for washing. As a cleaning pad reaches its maximum allowable usage cycle, for example, 300 times, a sorting device at a laundry facility can sort the cleaning pad out from any further use, based on the information provided by microchips 63. Moreover, controller 10 of intelligent mop 20 can also recognize this information, and stop accepting the cleaning pad for further use.

Moreover, microchip 63 not only provides a ID for cleaning pad during its use with intelligent mop 20, it also provides a ID for laundry and assists in quality control at the laundry facility. For example, after washing, cleaning pads received from different hospitals can be sorted using an automated sorting device according to the ID provided by microchips 63.

As described above, intelligent mop 20 has a key adaptor which is in communication with controller 110, or PC board 112. In one working scenario in a hospital environment, each room can have its key for intelligent mop 20. When the cleaning person comes in, he or she uses the room key to activate intelligent mop 20 before starting the cleaning. As the person finishes the room, the key is used again to deactivate the mop. Alternatively, either PC board 112 or key adaptor can include a sensing device, which senses a transmitting device installed at the room door, and activates or deactivates intelligent mop 20 when the sensing device indicates entering or existing a room.

The information collected in PC board 112 can be communicated with remote monitoring stations 16, or central computer or station, as described previously. A device for facilitating wireless communication can be placed inside support shaft 22. The remote monitoring stations, or central station, can also remotely control intelligent mop 20 through the communication with PC board 112. On the other hand, the information collected by PC board 112 can be downloaded via port 38 to a personal computer, or laptop computer for reviewing the activities or usage record of individual mops. In the latter manner, even if a facility does not have a remote monitoring station set up, the facility can still monitor the activities and usages of intelligent mop 20.

In a further embodiment, a global positioning system (GPS) can be incorporated into the advanced data controlled cleaning system of the present invention, to provide real time monitoring of the activities of a large number of intelligent mops in one or more facilities.

The invention has been described with reference to particularly preferred embodiments. It will be appreciated, however, that various changes can be made without departing from the spirit of the invention, and such changes are intended to fall within the scope of the appended claims. While the present invention has been described in detail and pictorially shown in the accompanying drawings, these should not be construed as limitations on the scope of the present invention, but rather as an exemplification of preferred embodiments thereof. It will be apparent, however, that various modifications and changes can be made within the spirit and the scope of this invention as described in the above specification and defined in the appended claims and their legal equivalents. All patents and other publications cited herein are expressly incorporated by reference.

What is claimed is:

1. An intelligent mop comprising:
   (a) a support shaft having upper and distal ends;
   (b) a flat mophead having a upper surface connected to said distal end of said support shaft by pivot means, and a substantially flat bottom surface;
   (c) a cleaning pad detachably secured to said bottom surface of said mophead;
   (d) a reservoir attached to said support shaft, for storing cleaning fluid;
   (e) a sprayer in fluid communication with said reservoir, for spraying said cleaning fluid from said reservoir;
   (f) a sensor for counting the number of times that said mophead oscillates; and
   (g) a controller in communication with said sensor, said controller enabling deactivation of said sprayer when a predetermined criterion is meet.

2. The intelligent mop of claim 1 further comprising a power supply device electronically connected to said sensor, controller, and sprayer.

3. The intelligent mop of claim 1, wherein said sprayer comprises a spray head, an electronic pump and valve assembly connected between said sprayer head and said reservoir for controlling spraying.

4. The intelligent mop of claim 3, wherein said spray head is disposed on said upper surface of said mophead.

5. The intelligent mop of claim 1, wherein said sensor is a motion sensor, disposed on said mophead or at distal end of said support shaft.

6. The intelligent mop of claim 1, wherein said controller is a PC board with software, said PC board being disposed on said mophead.

7. The intelligent mop of claim 6, wherein said cleaning pad comprises an identification device.

8. The intelligent mop of claim 7, wherein said identification device is a microchip electronically communicating with said controller.

9. The intelligent mop of claim 8 further comprising a key adaptor, for activation of said intelligent mop by a key.

10. The intelligent mop of claim 9, wherein said controller collects data from said sensor, said microchip, and said key adaptor.

11. The intelligent mop of claim 10, wherein said controller deactivates said sprayer when said data meets said predetermined criterion.

12. The intelligent mop of claim 10 further comprising a communication port for uploading software to and/or downloading data from said controller.

13. The intelligent mop of claim 10, wherein said IT system enables activation and deactivation of said intelligent mops.

14. The intelligent mop of claim 1, wherein said controller communicates remotely with an information-technology (IT) system.

15. An advanced data controlled cleaning system comprising:
   (i) a plurality of intelligent mops, each of said intelligent mops comprising:
      (a) a support shaft having upper and distal ends;
      (b) a mophead connected to said distal end of said support shaft;
      (c) a cleaning pad detachably secured to said mophead;
      (d) a reservoir connected to said support shaft, for storing cleaning fluid;
      (e) a sprayer in fluid communication with said reservoir, for spraying said cleaning fluid from said reservoir; and
      (f) a sensor for counting the number of times that said mophead oscillates; and
      (g) a controller in communication with said sensor; and
   (ii) an information-technology (IT) system in remote communication with said controller.

16. The advanced data controlled cleaning system of claim 15, wherein said IT system monitors activities of said plurality of intelligent mops in real time.

17. The advanced data controlled cleaning system of claim 15, wherein said IT system comprises one or more monitoring stations.

18. The intelligent mop of claim 15, wherein said controller is a PC board with software, said PC board being disposed on said mophead.

19. The intelligent mop of claim 18, wherein said cleaning pad comprises a microchip electronically communicating with said controller.

20. The intelligent mop of claim 19, wherein said controller collects data from said sensor and said microchip.

* * * * *